3,344,208
METHOD OF FABRICATING MIXED CERAMIC COMPACTS

William Munro, Newbury, England, assignor to United Kingdom Atomic Energy Authority, London, England
No Drawing. Filed June 12, 1964, Ser. No. 374,833
Claims priority, application Great Britain, June 17, 1963, 24,023/63
9 Claims. (Cl. 264—.5)

The present invention relates to ceramic materials and is particularly concerned with forming dispersions thereof.

It has been proposed to use fissile ceramic materials as the fuel in nuclear reactors, the materials proposed including the oxides of uranium and plutonium and mixtures thereof, and also the corresponding carbides. For use in reactors working at comparatively low temperatures, for example below about 600°C., the fuel may be sheathed in a metal can of, for example, stainless steel or a zirconium alloy. These materials are not suitable for use in reactors operating with gas temperatures in excess of about 750°C., but in such reactors the fuel material could be contained within a ceramic material which has a high melting point, i.e. in excess of about 2000°C. In the high temperature gas cooled reactor experiment known as Dragon the designed operating temperature, i.e. fuel surface temperature, is in the region of 1000°C. and a proposed fuel for this reactor comprises spheres of uranium carbide coated with pyrolytic carbon and dispersed in a graphite matrix.

It is preferred that the fissile material should occur in discrete particles within the matrix rather than being distributed uniformly through the matrix, since it is considered that this gives improved retention of fission products. It is also desirable that the overall bulk density of an oxide based dispersed fuel should be as high as possible, since this also gives improved fission product retention. In carbide fuels however, the fission product retention is achieved by the use of the coating of pyrolytic carbon, the graphite matrix material merely acting to hold the particles together and the density of the matrix material having little effect on the fission product retention.

It is the object of the present invention to provide a new or improved method of dispersing particles of fissile ceramic materials in a ceramic matrix which can subsequently be sintered to high density.

According to the present invention there is provided a method of dispersing a first ceramic material in a matrix of a second ceramic material, such method comprising mixing particles of the first ceramic material with a powder of the second ceramic material containing a small quantity of wax so as to form a coating of the second material on the particles of the first material, packing and compacting the coated particles, heating the compact under reduced pressure to distill off the wax and sintering the de-waxed compact.

According to a further aspect of the present invention there is also provided, in the production of a nuclear fuel, a method of dispersing a first fissile or fertile ceramic material in a matrix of a second non-fissile and non-fertile ceramic material, such method comprising mixing particles of the said first ceramic material with a powder of the second ceramic material containing a small quantity of wax so as to form a coating of the second ceramic material on the particles of the first material, packing and compacting the coated particles, heating the compact under reduced pressure to distill off the wax and sintering the de-waxed compact.

Conveniently the present invention may be applied to the production of dispersions containing fissile or fertile ceramic materials and such materials which are suitable for use according to the present invention include the oxides of uranium, thorium and plutonium and mixtures thereof; such ceramic materials may also include other ceramic compounds of these elements where chemical compatability, thermal expansion and other features are suitable.

Materials which are suitable for the matrix include ceramic oxides such as beryllia, alumina, and magnesia.

It will be realized that it is essential that the dispersed fuel material should be chosen to be compatible with the matrix material, and that it is undesirable that the dispersed and matrix materials should react together, since such a reaction would probably result in a volume change and thus the weakening of the compact.

Conveniently the particles which are to be dispersed should be relatively large and are desirably spheres of diameter 150–250 microns, so as to reduce fission product damage to the matrix. The matrix material should be in the form of a relatively fine powder for example sieved to give agglomerates of less than 200 mesh BSS i.e. less than 76 microns.

These agglomerates may consist of particles of size about 1 micron and may break down in the subsequent mixing with the larger particles which are being dispersed. The matrix powder is coated with the wax prior to mixing with the particles to be dispersed. The coating with wax may be accomplished by any of the known methods and it is presently preferred to mix the powder with petroleum ether containing dissolved wax and subsequently to allow the petroleum ether solvent to evaporate off. The particles which are to be dispersed may be mixed with the waxed ceramic powder in a rotating drum which is conveniently heated, for example by means of an infrared lamp.

The cold-compacted pellets may be dewaxed by heating gently to a temperature of about 250°C. in a vacuum furnace.

In order that the process of the present invention may more readily be understood, the production of a dispersion of uranium dioxide spheres in a matrix of beryllia will now be described by way of example.

Beryllia powder was sieved to give agglomerates of less than 300 mesh BSS (53 microns) and 8% by weight of refined paraffin wax (setting point 50°C.) dissolved in petroleum ether was then added to the powder. The petroleum ether was allowed to evaporate giving a waxed beryllia powder. This waxed beryllia powder was then added to spheres of sintered uranium dioxide of diameter 150–250 microns, which were contained within a brass drum which was revolving with its axis horizontal at a rate sufficient to give a surface speed of 100 feet per minute. An infrared lamp was used to heat the inner drum surface to a temperature of about 50°C. After a period of mixing the spheres with the waxed powder, the spheres became uniformly coated with the beryllia and further additions of waxed beryllia powder were made until sufficient beryllia had been added to give a beryllia content of 80% by volume.

When the required quantity of beryllia had been added the coated spheres were poured into a steel die and close packed by vibrating the die. The packed material was then cold compacted by pressing at 20,000 p.s.i. to give pellets of uranium dioxide dispersed uniformly in a matrix of beryllia. These pellets were placed in a vacuum furnace and dewaxed by heating at 250° C. for 12 hours at a pressure of about 10 microns, the wax collecting in a cold upper part of the vacuum apparatus. The de-waxed pellets were placed in a hydrogen-nitrogen atmosphere furnace and sintered by heating at 1750°C. for 2 hours. The sintered product produced had a density in excess of 95% of the theoretical value.

Using smaller quantities of paraffin wax, for example 3–5% by weight, the product obtained was similar to that of the foregoing example. However, using such smaller quantities of wax it was found that the powder stuck to the uranium dioxide particles less readily than when larger quantities of wax were used.

I claim:

1. A method of dispersing a first ceramic material in a matrix of a second ceramic material comprising the steps of mixing a powder of the second ceramic material with a small quantity of wax to give a substantially dry waxed powder of the second ceramic material substantially free of solvent and in which the wax coats and adheres to the second powder, mixing particles of the first ceramic material with said substantially dry waxed powder to form a coating of the second ceramic material on the particles of the first ceramic material, pressing the coated particles to form a compact, distilling off the wax by heating the compact under reduced pressure and heating the de-waxed compact to a sintering temperature.

2. A method for producing a nuclear fuel material comprising a dispersion of particles of a nuclear ceramic material in a matrix of a nonnuclear ceramic material, such method comprising the steps of mixing a powder of the nonnuclear ceramic material with a small quantity of wax to give a substantially dry waxed powder of the nonnuclear ceramic material substantially free of solvent and in which the wax coats and adheres to the nonnuclear ceramic material, mixing particles of the nuclear ceramic material with the said substantially dry waxed powder to form a coating of the nonnuclear ceramic on the particles of the nuclear ceramic material, pressing the coated particles to form a compact, distilling off the wax by heating the compact under reduced pressure and heating the de-waxed compact to a sintering temperature.

3. The method of claim 2 wherein the nuclear ceramic material is an oxide selected from the group consisting of the oxides of uranium, plutonium, thorium and mixtures thereof and the nonnuclear ceramic material is an oxide selected from the group consisting of alumina, beryllia and magnesia.

4. The method of claim 3 wherein the particles of the nuclear ceramic material are spheres of diameter 150–250 microns and the powder of the nonnuclear ceramic material is sieved to give agglomerates of less than 76 microns before mixing the powder with the wax.

5. The method of claim 3 wherein the said substantially dry waxed powder is formed by dissolving the wax in petroleum ether, adding the solution to the powder of the nonnuclear ceramic material and evaporating the said petroleum ether, the said steps for forming the substantially dry wax powder preceding the said step of mixing the particles of the nuclear ceramic material with the said substantially dry waxed powder.

6. The method of claim 3 wherein the wax is added to the nonnuclear ceramic material in the proportion of 3–8% by weight.

7. The method of claim 3 wherein the waxed powder is mixed with the nuclear ceramic material in a heated revolving drum.

8. The method of claim 3 wherein the wax is distilled from the compact by heating to a temperature of 250°C. at a pressure of about 10 microns.

9. The method of claim 3 wherein the de-waxed compact is sintered at a temperature of 1750°C. for two hours in a hydrogen-nitrogen atmosphere.

References Cited

UNITED STATES PATENTS

| | | | |
|---|---|---|---|
| 3,122,595 | 2/1964 | Oxley | 264—.5 |
| 3,158,547 | 11/1964 | Smith | 264—.5 |
| 3,161,701 | 12/1964 | Johnson et al. | 264—.5 |

OTHER REFERENCES

AEC Documents: BMI–1321, Feb. 18, 1959, all 8 pages; BMI–1579, May 22, 1962, cover page and pages C–1 to C–3.

L. DEWAYNE RUTLEDGE, *Primary Examiner.*

CARL D. QUARFORTH, *Examiner.*